United States Patent
Pattabhi et al.

(10) Patent No.: US 9,311,369 B2
(45) Date of Patent: Apr. 12, 2016

(54) VIRTUAL MASKED DATABASE

(75) Inventors: Ravi Pattabhi, Stow, MA (US); Harish Akali, Merrimack, NH (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 996 days.

(21) Appl. No.: 12/228,716

(22) Filed: Aug. 15, 2008

(65) Prior Publication Data

US 2010/0042643 A1   Feb. 18, 2010

(51) Int. Cl.
*G06F 17/30* (2006.01)

(52) U.S. Cl.
CPC ............... *G06F 17/30566* (2013.01)

(58) Field of Classification Search
None
See application file for complete search history.

(56) References Cited

U.S. PATENT DOCUMENTS

| | | | |
|---|---|---|---|
| 6,233,588 B1 * | 5/2001 | Marchoili et al. | |
| 6,567,539 B1 * | 5/2003 | Benezeth | 382/124 |
| 7,185,017 B1 * | 2/2007 | Cauvin et al. | |
| 2003/0014394 A1 * | 1/2003 | Fujiwara et al. | 707/3 |
| 2006/0074897 A1 * | 4/2006 | Fergusson | 707/4 |
| 2006/0265375 A1 * | 11/2006 | Hess | G06F 21/6227 |
| 2007/0220004 A1 * | 9/2007 | Fifield et al. | 707/9 |
| 2007/0299881 A1 * | 12/2007 | Bouganim | 707/200 |
| 2008/0065665 A1 * | 3/2008 | Pomroy et al. | 707/101 |
| 2008/0083018 A1 * | 4/2008 | Prokupets et al. | 726/4 |
| 2008/0208897 A1 * | 8/2008 | Lew et al. | 707/103 R |
| 2009/0024565 A1 * | 1/2009 | Wong | 707/2 |
| 2009/0100527 A1 * | 4/2009 | Booth et al. | 726/27 |

* cited by examiner

*Primary Examiner* — Hosain Alam
*Assistant Examiner* — Thu Nga Nguyen
(74) *Attorney, Agent, or Firm* — Kraguljac Law Group, LLC

(57) ABSTRACT

Systems, methods, and other embodiments associated with virtual masked databases are described. One example system includes a masking logic to mask an unmasked column of a database table to produce a masked column. The masked column is then added to the database creating a bi-masked database. A portion of the bi-masked database is then selected by a view logic and provided to a user. The view provided to the user may allow fast, conflict free queries and updates to the database. By providing the user either masked or unmasked data based on information associated with the user, an added layer of data security may be achieved.

20 Claims, 4 Drawing Sheets

VIRTUAL MASKED DATABASE

CROSS REFERENCE TO RELATED APPLICATIONS

This application is related to the following U.S. patent application, which is assigned to the present assignee: "Non-Repeating Random Values in User Specified Formats and Character Sets", Ser. No. 12/150,392 filed Apr. 28, 2008, inventors: Pattabhi et al.

BACKGROUND

Some companies and organizations, especially those that keep thorough client records, manage databases that can grow to sizes of terabytes and larger. In databases of these sizes, it becomes increasingly costly to run simple queries against the entire database. To avoid this, a company may copy a portion of the database to an external staging area to allow employees to have faster access to data they are likely to use. For example, an insurance claim manager may be assigned to handle claims from a small region. Thus, the company may provide the claim manager with a copy of the data that only includes information on claims from that region: However, any changes an employee makes to their portion of the database must be propagated back to the original database. This may be expensive. Furthermore, propagating changes may lead to race conditions if two portions of the database contain overlapping data.

Additionally, many businesses utilize data that must be kept secure. For example, some medical applications and insurance applications must comply with the Health Insurance Portability and Accountability Act (HIPAA) to prevent negligent, malicious, and/or otherwise inappropriate uses of patient data. In another example, credit companies may employ databases including social security numbers and other data that, if it were to fall into the wrong hands, could lead to increased identity theft risk for a company's clients. Some regulations and/or company policies may require that certain data not be shown to certain employees. Some conventional systems that employ an external database as described above simply supply a NULL value when an employee does not have proper clearance. This may cause some downstream applications to break due to the lack of a required value. Other conventional systems may mask values supplied to an employee without proper clearance. However, these systems may also cause conflicts both with downstream applications and when data is being propagated back to the original database.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
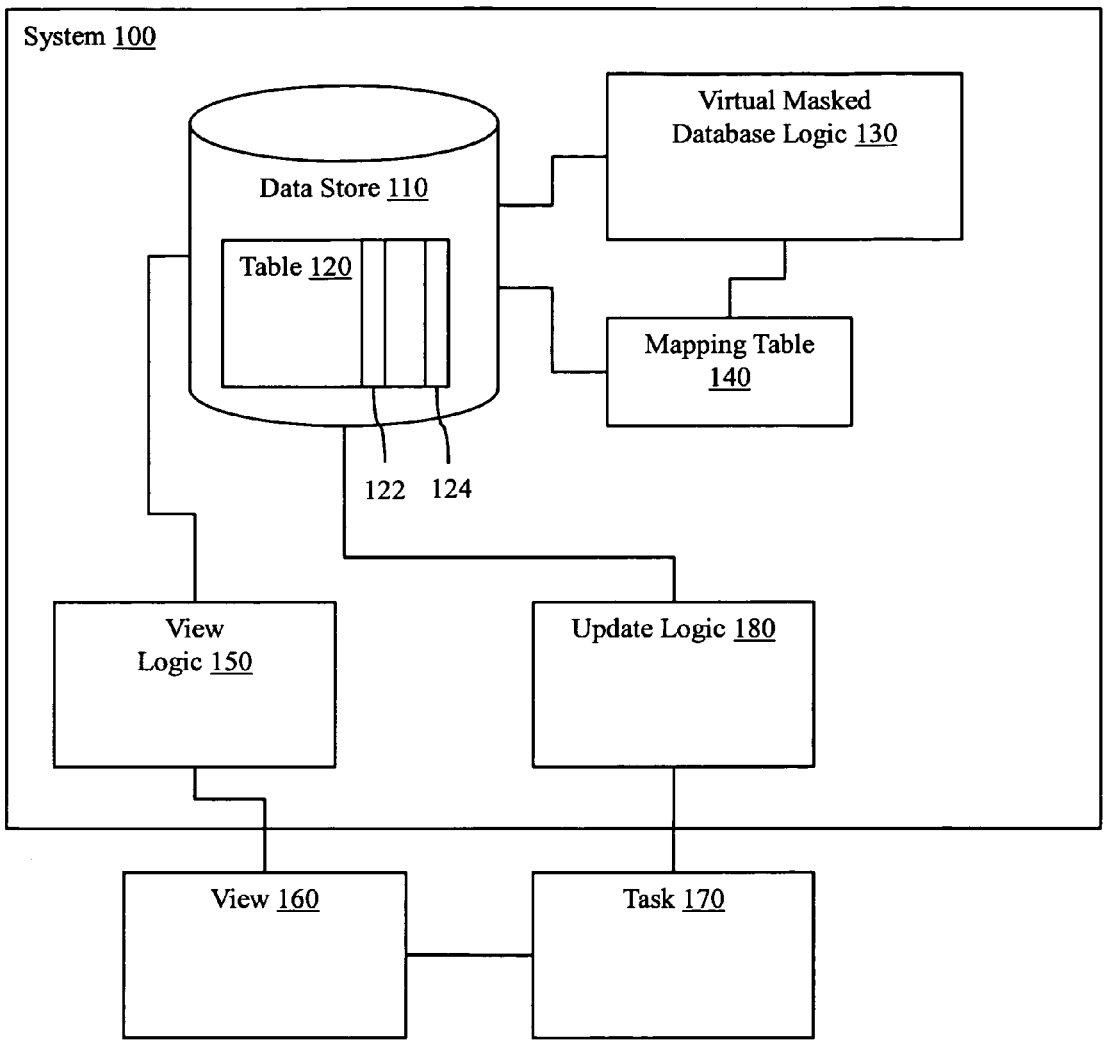
FIG. 1 illustrates an example system associated with virtual masked databases.

Example systems and methods associated with virtual masked databases are described. One example system includes a masking logic to mask an unmasked column of a database table to produce a masked column. The masked column is then added to the database creating a bi-masked database. Data in the masked column may be generated so that it is still usable by downstream applications. In one example, a credit card number with sixteen digits may be masked into a number also with sixteen digits and the second (masked) sixteen digit number may be stored in the database. In another example, if the last four digits of a nine digit social security number are used for authentication purposes, the masking logic may only mask the first five digits of the social security number and store the masked five digits in a separate column.

A portion of the bi-masked database is then selected by a view logic and provided to a user. The portion includes data from the column of masked data or data from the column of unmasked data, but not both. The column selected may be based, at least in part, on a piece of information (e.g. a permission setting) associated with the user. Providing a view may allow the user to run database queries that do not examine the entire database. This may speed up database accesses without using a copy at an external staging area. The system also includes an update logic to update a field of data in the data store. The update is based, at least in part, on a result of a task performed by the user where the task uses information provided to the user from the view logic. Because the view is providing a view of a subset of the real database, updates performed by the update logic may modify the actual database. Thus, no changes need to be propagated between two versions of a database potentially saving time and memory. Race conditions due to overlapping portions may also be eliminated. The updating may be based on mapping information that associates the masked column and the unmasked column that is generated by the masking logic. This may allow applications provided with a piece of information from the masked column to update information in the unmasked column with which the piece of information in the masked column is associated. One skilled in the art will appreciate that updates may be made through the view. Over time, as data is added to the database, it may be incrementally masked. Which data, if any, is incrementally masked may be controlled, at least in part, by data stored in the mapping table.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
PCI: peripheral component interconnect.
PCIE: PCI express.
RAM: random access memory.
DRAM: dynamic RAM.
SRAM: synchronous RAM.
ROM: read only memory.
PROM: programmable ROM.
SQL: structured query language.
OQL: object query language.
USB: universal serial bus.
XML: extensible markup language.
WAN: wide area network.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data. A data store may be, for example, a database, a table, a file, a data structure (e.g. a list, a queue, a heap, a tree) a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Query", as used herein, refers to a semantic construction that facilitates gathering and processing information. A query may be formulated in a database query language (e.g., SQL), an OQL, a natural language, and so on.

"Signal", as used herein, includes but is not limited to, electrical signals, optical signals, analog signals, digital signals, data, computer instructions, processor instructions, messages, a bit, a bit stream, and so on, that can be received, transmitted and/or detected.

"Software", as used herein, includes but is not limited to, one or more executable instructions that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, logics, computers or other devices, or combinations of these.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is to be appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

FIG. 1 illustrates a system 100 associated with virtual masked databases. System 100 includes a data store 110. Data store 110 may store a database table 120. The database table 120 may include data associated with an insurance application, a business management application, a medical application, a security application, a sales application, a financial application, and so on. System 100 also includes a virtual masked database logic 130. Virtual masked database logic 130 may mask a column 122 of the database table 120 to produce a masked column 124. In one example column 122 may contain confidential information. The confidential information may include, social security numbers, credit card numbers, dates of birth, names, addresses, insurance claims, phone numbers, email addresses, passwords, medical information, security keys, and so on. Masked column 124 may be produced by masking portions of the fields in unmasked column 122. Thus, fields in masked column 124 may include information that is partially masked and partially unmasked. In one example, virtual masked database logic 130 may generate unique values for fields in masked column 124. Virtual masked database logic 130 may also add masked column 124 to the database table to make database table 120 a bi-masked database table. Creating the bi-masked database table 120 may include updating a mapping table 140 to associate masked column 124 with a column of unmasked data 122 from which the masked column was produced. Selectively providing masked or unmasked data facilitates providing an additional layer of security.

System 100 also includes a view logic 150. View logic 150 may provide a view 160 of a portion of bi-masked database table 120. View 160 may be provided to a user. View 160 may include a field. The field may represent at least one of and not more than one of, a field of masked data, and a field of unmasked data from which the field of masked data was derived. The field provided may depend on a piece of information associated with the user. The piece of information associated with the user may be a permission setting, a flag, an identification number, a password, a cryptographic key and so on. For example, the user may be provided with the field of masked data if they do not have an appropriate permission setting, and the user may be provided with the field of unmasked data if they do have an appropriate permission setting.

System 100 also includes an update logic 180. Update logic 180 may update a field of data in the data store based on a result of a task 170. In one example task 170 may be performed by the user. In another example task 170 may be performed by a logic initiated by the user. In another example, update logic 180 may incrementally update data that is added to table 120. The incremental update may include masking data based, at least in part, on data stored in the mapping table 140. Task 170 may use the information contained in the field provided to the user. Updating the field of data in the data store 110 may depend on information contained in the mapping table. For example, a user, based on a permission setting, may be provided with a field of masked data. Over the course of a task, the user receives updated information for the field of masked data. The user may then replace their masked data with the updated data and then trigger a database update. The update logic 180 may automatically update the unmasked field in the original database instead of the masked field by examining the mapping table.

By way of illustration, an insurance company may have multiple levels of claims managers including a claims adjustor and a claims administrator. A claims adjustor may be an employee clients typically reach when they call the insurance company on the phone. A claims administrator may oversee the work of several claims adjustors at a location responsible for handling, for example, all claims originating in a state. For security reasons, claims adjustors may not be able to view certain pieces of client information such as their social security number. Thus, a bi-masked database table 120 for the insurance company may contain a column of unmasked social security numbers and a column of masked social security numbers and/or a column of partially masked social security numbers. A view 160 provided to the claims adjustor may include social security numbers from a masked column, and a view 160 provided to a claims administrator may include social security numbers from the unmasked column.

If, in one example, due to a data entry error, a social security number were input incorrectly, the claims adjustor may not be able to verify that the correct social security number were on file. However, the claims adjustor may elevate the request to a claims administrator who would be able to verify and/or correct the social security number. In another example, the claims adjustor may be able to modify, but not view, the unmasked social security number in the bi-masked database table 120. In this example, if a client were to request a change to a value typically masked to the claims adjustor, the adjustor may be able to input the new value and initiate an update. The update logic 180, even though the adjustor is requesting a change to a masked value, may be able to update the unmasked value when processing the update by examining the mapping table 140.

Figure 2:
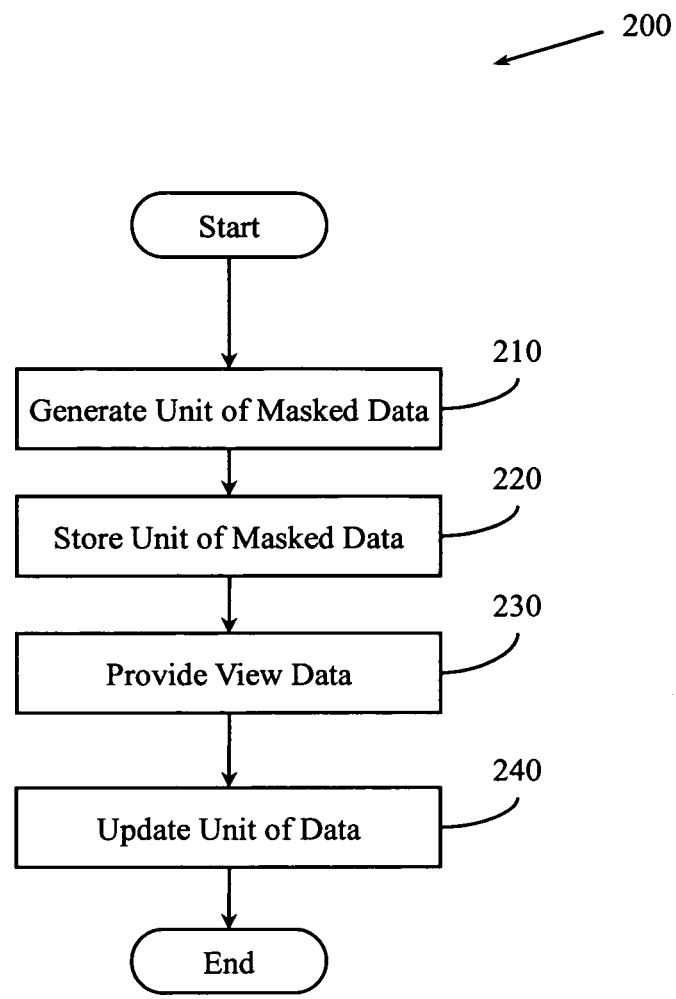
FIG. 2 illustrates an example method associated with virtual masked databases.

FIG. 2 illustrates a method 200 associated with virtual masked databases. Method 200 may be applicable to an insurance application, a business management application, a medical application, a security application, a sales application, a financial application, and so on. Method 200 includes, at 210, generating a unit of masked data. The unit of masked data may be generated from a unit of unmasked data in a data store. The data store may be, for example, a database, a database table, an array, a tree, a linked list, a file, a row of a database table, a column of a database table, and so on. The unit of unmasked data may be a database table, a column, a field, a node, and so on. The unit of masked data may include data associated with sensitive information including for example, social security numbers, and so on. The unit of masked data may be generated by masking a portion of the unit of unmasked data. Thus the unit of masked data may include masked data and unmasked data. One skilled in the art will appreciate that later arriving data may be incrementally masked and stored.

Method 200 also includes, at 220, storing the unit of masked data in the data store. Thus, the data store may include two columns, a column of unmasked data and a column of corresponding masked data. The storing may include updating a mapping guide to relate the unit of masked data to the unit of unmasked data. In one example, updating the mapping guide includes updating a mapping table. The mapping table may include information that associates sets of masked data with unmasked data from which the sets of masked data were derived. In another example, updating the mapping guide may include naming the unit of masked data so that it identifies the unit of masked data. For example if a column of unmasked data were labeled "name", a column of masked data generated from the "name" column could be labeled "name-2" or "masked-name". Though two possible naming conventions are illustrated, one skilled in the art will appreciate that other conventions may be applied.

Method 200 also includes, at 230, providing a set of view data from the data store. The data may be provided to an entity. In one example, the entity may be a user. In another example, the entity may be a logic. The view data may include the unit of masked data or the unit of unmasked data, but not both. The unit provided may depend on a piece of information associated with the entity. The piece of information associated with the entity may be, for example, a permission setting, an identification number, a password, a cryptographic key, and so on from which a determination concerning whether masked or unmasked data will be provided. Method 200 also includes, at 240, updating a unit of data in the data store. The updating may be based on a result of a task performed by the entity. The task may use an element of the set of view data. Updating the unit of data in the data store may depend on information in the mapping guide.

While FIG. 200 illustrates various actions occurring in serial, it is to be appreciated that various actions illustrated in FIG. 200 could occur substantially in parallel. By way of illustration, a first process could generate and store a unit of masked data, a second process could provide a set of view data, and a third process could update a unit of data in the data store. While three processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform a method. While executable instructions associated with the above method are described as being stored on a computer-readable medium, it is to be appreciated that executable instructions associated with other example methods described herein may also be stored on a computer-readable medium.

Figure 3:
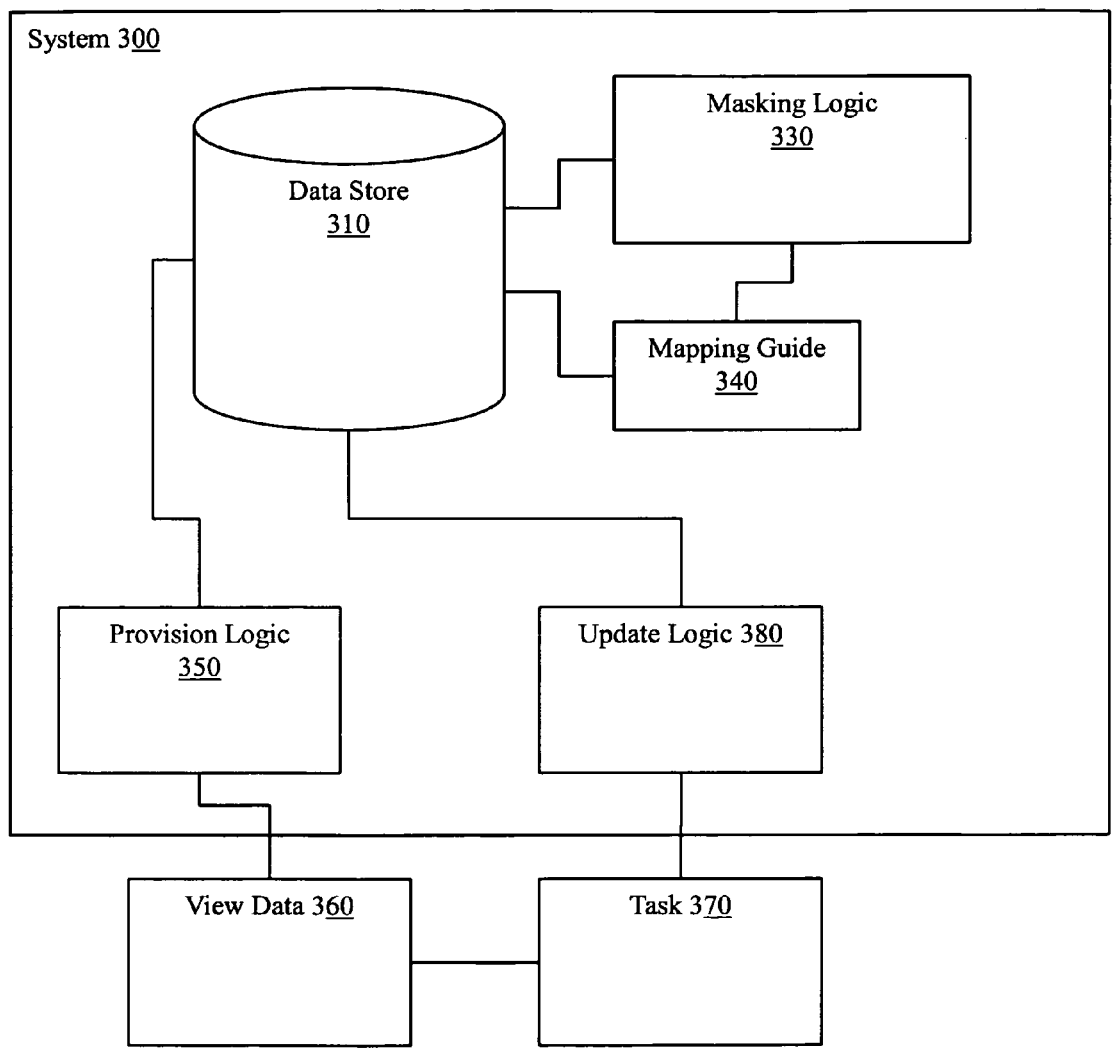
FIG. 3 illustrates an example system associated with virtual masked databases

FIG. 3 illustrates a system 300. System 300 may be associated with applications including, for example, insurance, business management, health care, and so on. These systems may include sensitive information and may also provide views of subsets of data to remote locations. System 300 includes a data store 310. Data store 310 may be a database, a database table, an array, a tree, a linked list, a file, a row of a database, a column of a database, and so on. Data store 310 may store a set of data. The set of data may include sensitive information (e.g., social security number, medical information). The set of data may include a unit of unmasked data. The unit of unmasked data may be a database table, a column in the database table, a field in the column, and so on.

System 300 also includes a masking logic 330. Masking logic 330 may generate a unit of masked data. The unit of masked data may be generated from the unit of unmasked data. The unit of masked data may be generated by masking a portion of the unit of unmasked data. In one example, the portion may be the entire unit of unmasked data while in another example the portion may be less than the entire unit of unmasked data. Thus the unit of masked data may include masked data and unmasked data. Masking logic 330 may also add the unit of masked data to the set of data in the data store 310. Adding the unit of masked data may include updating a mapping guide 340 to relate the unit of masked data to the unit of unmasked data. In one example, updating mapping guide 340 may include updating a mapping table. In another example, updating mapping guide 340 may include naming the unit of masked data so that it identifies the unit of unmasked data.

System 300 also includes a provision logic 350. Provision logic 350 may provide an entity with a set of view data 360 from the data store 310. The view data 360 may be a materialized view. In one example, the entity may be a user. In another example, the entity may be a logic. The provision may be based on a signal received from the entity. For example, a claims adjustor may request records associated with claimants to be visited in the next few days. Set of view data 360 may include one, but not both of the unit of masked data and the unit of unmasked data. The unit provided may depend on a piece of information associated with the entity. For example, an adjustor may receive a first set of data that includes more masked data while a security auditor may receive a second set of data that includes more unmasked data. System 300 also includes an update logic 380. Update logic 380 may update a unit of data in the data store 310. The unit of data may be updated based on a result of a task 370 performed by the entity. For example, an adjustor may change a claimant's email address based on an interview with the claimant. Similarly, a security auditor may change a masked field like a claimant's social security number based on a review of social security records and credit records. This may occur more frequently as individuals respond to identity theft. Task 370 may use an element of the set of view data. Updating data in the data store 310 may depend on information contained in the mapping guide.

Figure 4:
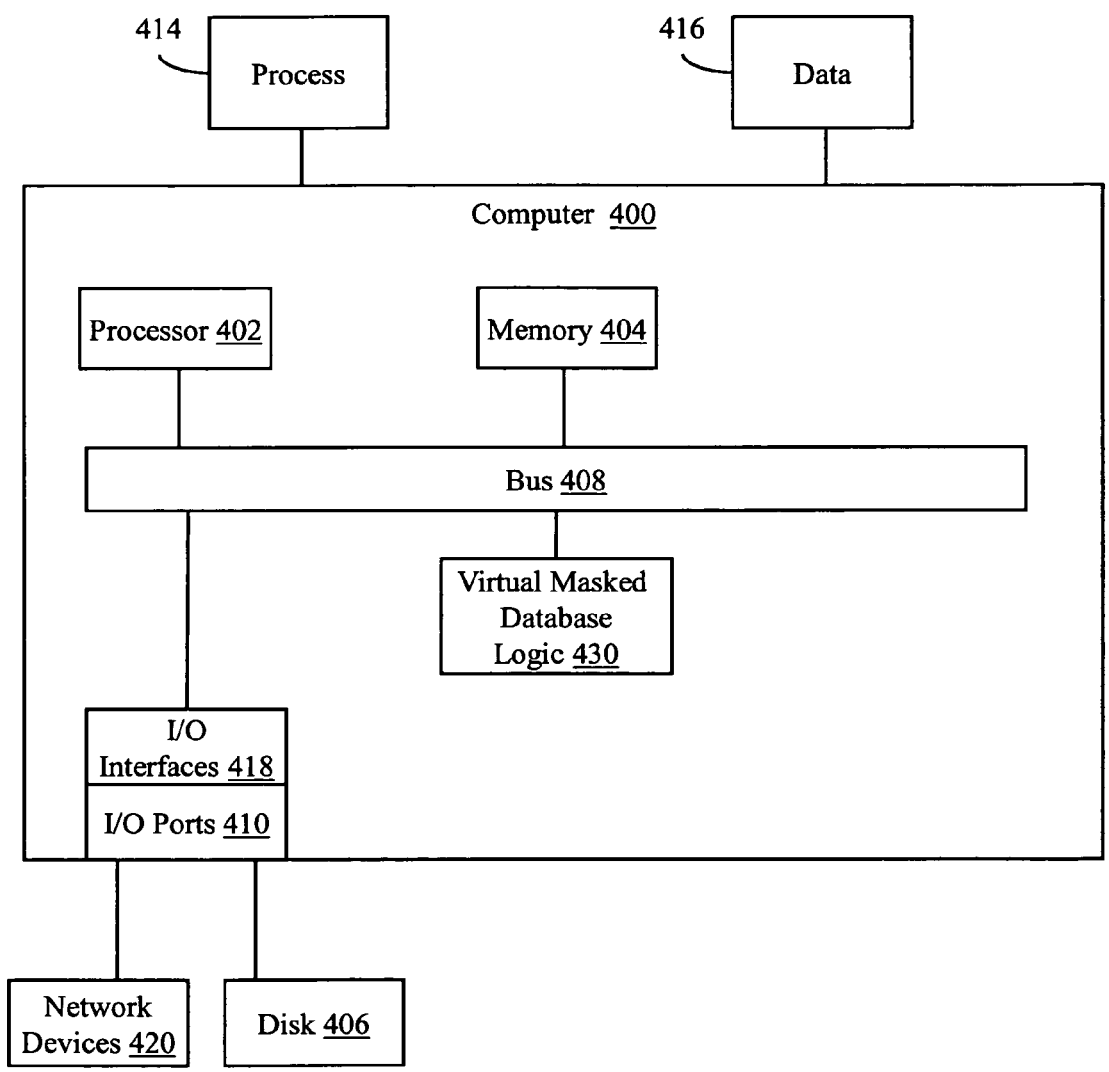
FIG. 4 illustrates an example computing environment in which example systems and methods, and equivalents, may operate.

FIG. 4 illustrates an example computing device in which example systems and methods described herein, and equivalents, may operate. The example computing device may be a computer 400 that includes a processor 402, a memory 404, and input/output ports 410 operably connected by a bus 408. In one example, the computer 400 may include a virtual masked database logic 430. In different examples, the logic 430 may be implemented in hardware, software, firmware, and/or combinations thereof. While the logic 430 is illustrated as a hardware component attached to the bus 408, it is to be appreciated that in one example, the logic 430 could be implemented in the processor 402. Thus, logic 430 may provide means (e.g., hardware, software, firmware) for generating a unit of masked data from a unit of masked data. Logic 430 may also provide means (e.g., hardware, software, firmware) for adding the unit of masked data to the set of data. The adding may include updating a mapping guide to relate the unit of masked data to the unit of unmasked data. Logic 430 may also provide means (e.g., hardware, software, firmware) for providing, to an entity, a set of view data from the set of data. The set of view data may include the unit of masked data or the unit of unmasked data, but not both. The unit selected may depend on a piece of entity identifying information associated with the entity. Logic 430 may also provide means (e.g., hardware, software, firmware) for updating a unit of data in the set of data where the updating is based, at least in part, on a task performed by the entity. The task may have input an element of the set of view data and produced a new value. Updating a value in the data store may depend on the new value and on information in the mapping guide. The means associated with logic 430 may be implemented, for example, as an ASIC. The means may also be implemented as computer executable instructions that are presented to computer 400 as data 416 that are temporarily stored in memory 404 and then executed by processor 402.

Generally describing an example configuration of the computer 400, the processor 402 may be a variety of various processors including dual microprocessor and other multiprocessor architectures. A memory 404 may include volatile memory and/or non-volatile memory. Non-volatile memory may include, for example, ROM, PROM, and so on. Volatile memory may include, for example, RAM, SRAM, DRAM, and so on.

A disk 406 may be operably connected to the computer 400 via, for example, an input/output interface (e.g., card, device) 418 and an input/output port 410. The disk 406 may be, for example, a magnetic disk drive, a solid state disk drive, a floppy disk drive, a tape drive, a Zip drive, a flash memory card, a memory stick, and so on. Furthermore, the disk 406 may be a CD-ROM drive, a CD-R drive, a CD-RW drive, a DVD ROM drive, a Blu-Ray drive, an HD-DVD drive, and so on. The memory 404 can store a process 414 and/or a data 416, for example. The disk 406 and/or the memory 404 can store an operating system that controls and allocates resources of the computer 400.

The bus 408 may be a single internal bus interconnect architecture and/or other bus or mesh architectures. While a single bus is illustrated, it is to be appreciated that the computer 400 may communicate with various devices, logics, and peripherals using other busses (e.g., PCIE, 1394, USB, Ethernet). The bus 408 can be types including, for example, a memory bus, a memory controller, a peripheral bus, an external bus, a crossbar switch, and/or a local bus.

The computer 400 may interact with input/output devices via the i/o interfaces 418 and the input/output ports 410. Input/output devices may be, for example, a keyboard, a microphone, a pointing and selection device, cameras, video cards, displays, the disk 406, the network devices 420, and so on. The input/output ports 410 may include, for example, serial ports, parallel ports, and USB ports.

The computer 400 can operate in a network environment and thus may be connected to the network devices 420 via the i/o interfaces 418, and/or the i/o ports 410. Through the network devices 420, the computer 400 may interact with a network. Through the network, the computer 400 may be logically connected to remote computers. Networks with which the computer 400 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "A or B but not both" then the term "A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, ABC, AAA, MB, MBB, MBBC, MBBCC, and so on (e.g., the data store may store only A, only B, only C, A&B, A&C, B&C, A&B&C, A&A&A, A&A&B, A&A&B&B, A&A&B&B&C, A&A&B&B&C&C, and so on). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:
1. A system, comprising:
a data store configured to store a database table that stores sets of data corresponding to records in respective rows, where the database table includes an unmasked column that stores an unmasked version of given data and a masked column that stores a masked version of the data such that each row includes i) a unmasked field in the unmasked column that stores an unmasked version of data, and ii) a masked field in the masked column that stores the masked version of the data;
view logic configured to:
receive a request from a first user to view data in a record;
access a row in the database table that stores the record;
determine that the first user is not authorized to view an unmasked version of the data; and
provide a view that includes a masked version of the data in a masked field in the row; and
update logic configured to:
receive, from the first user, a modification to the masked version of data in the masked field;
access a mapping table to identify an unmasked field that stores an unmasked version of the data; and
update the unmasked version of the data in the identified unmasked field to correspond to the modification made to the masked version of the data.
2. The system of claim 1, where the view logic is configured to determine that the first user is not authorized to view the unmasked version of the data based, at least in part, on one or more of a permission setting, an identification number, a password, and a cryptographic key.
3. The system of claim 1, where the update logic is further configured to:
generate a masked version of the updated unmasked data; and
store the masked version of the data in the masked field in the row.
4. The system of claim 3 where the update logic is further configured to generate the masked version of the updated unmasked data by generating a random, non-repeating value.
5. The system of claim 3 where the update logic is further configured to generate the masked version of the updated unmasked data by masking a portion of the unmasked data, such that the masked version of the data includes masked data and unmasked data.
6. The system of claim 1, where the view logic is further configured to:

receive a request from a second user to view the data in the record;
access the row in the database table that stores the record;
determine that the second user is authorized to view an unmasked version of the data; and
provide a view that includes the unmasked version of the data in an unmasked field in the row.

7. The system of claim 1 where the update logic is further configured to update the unmasked version of the data without allowing the user to view the unmasked version of the data stored in the unmasked field.

8. A non-transitory computer-readable medium storing computer-executable instructions that when executed by a computer cause the computer to:
store a database table that stores sets of data corresponding to records in respective rows, where the database table includes an unmasked column that stores an unmasked version of given data and a masked column that stores a masked version of the data such that each row includes i) a unmasked field in the unmasked column that stores an unmasked version of data, and ii) a masked field in the masked column that stores the masked version of the data; and
receive a request from a first user to view data in a record;
access a row in the database table that stores the record;
determine that the first user is not authorized to view an unmasked version of the data; and
provide a view that includes a masked version of the data in a masked field in the row;
receive, from the first user, a modification to the masked version of data in the masked field;
access a mapping table to identify an unmasked field that stores an unmasked version of the data; and
update the unmasked version of the data in the identified unmasked field to correspond to the modification made to the masked version of the data.

9. The non-transitory computer-readable medium of claim 8, further comprising instructions configured to cause the computer to determine that the first user is not authorized to view the unmasked version of the data based, at least in part, on one or more of a permission setting, an identification number, a password, and a cryptographic key.

10. The non-transitory computer-readable medium of claim 8, further comprising instructions configured to cause the computer to:
generate a masked version of the updated unmasked data; and
store the masked version of the data in the masked field in the row.

11. The non-transitory computer-readable medium of claim 10, further comprising instructions configured to cause the computer to generate the masked version of the updated unmasked data by generating a random, non-repeating value.

12. The non-transitory computer-readable medium of claim 10, further comprising instructions configured to cause the computer to generate the masked version of the updated unmasked data by masking a portion of the unmasked data, such that the masked version of the data includes masked data and unmasked data.

13. The non-transitory computer-readable medium of claim 8, further comprising instructions configured to cause the computer to:
receive a request from a second user to view the data in the record; access the row in the database table that stores the record;
determine that the second user is authorized to view an unmasked version of the data; and
provide a view that includes the unmasked version of the data in an unmasked field in the row.

14. The non-transitory computer-readable medium of claim 8, further comprising instructions configured to cause the computer to update the unmasked version of the data without allowing the user to view the unmasked version of the data stored in the unmasked field.

15. A computer-implemented method, comprising:
storing a database table that stores sets of data corresponding to records in respective rows, where the database table includes an unmasked column that stores an unmasked version of given data and a masked column that stores a masked version of the data such that each row includes i) a unmasked field in the unmasked column that stores an unmasked version of data, and ii) a masked field in the masked column that stores the masked version of the data; and
receiving a request from a first user to view data in a record;
accessing a row in the database table that stores the record;
determining that the first user is not authorized to view an unmasked version of the data; and
providing a view that includes a masked version of the data in a masked field in the row;
receiving, from the first user, a modification to the masked version of data in the masked field;
accessing a mapping table to identify an unmasked field that stores an unmasked version of the data; and
updating the unmasked version of the data in the identified unmasked field to correspond to the modification made to the masked version of the data.

16. The computer-implemented method of claim 15, further comprising:
receiving a request from a second user to view the data in the record;
accessing the row in the database table that stores the record;
determining that the second user is authorized to view an unmasked version of the data; and
providing a view that includes the unmasked version of the data in an unmasked field in the row.

17. The computer-implemented method of claim 15, further comprising determining that the first user is not authorized to view the unmasked version of the data based, at least in part, on one or more of a permission setting, an identification number, a password, and a cryptographic key.

18. The computer-implemented method of claim 15, further comprising updating the unmasked version of the data without allowing the user to view the unmasked version of the data stored in the unmasked field.

19. The computer-implemented method of claim 15, further comprising:
generating a masked version of the updated unmasked data; and
storing the masked version of the data in the masked field in the row.

20. The computer-implemented method of claim 19, further comprising generating the masked version of the updated unmasked data by generating a random, non-repeating value.

* * * * *